United States Patent
Alderucci et al.

(10) Patent No.: US 12,236,750 B2
(45) Date of Patent: Feb. 25, 2025

(54) MOBILE GAMING ALERT

(71) Applicant: CFPH, LLC, New York, NY (US)

(72) Inventors: Dean P. Alderucci, Westport, CT (US); Charles Plott, Pasadena, CA (US); Mark Miller, Chicago, IL (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/369,382

(22) Filed: Sep. 18, 2023

(65) Prior Publication Data

US 2024/0005733 A1 Jan. 4, 2024

Related U.S. Application Data

(63) Continuation of application No. 17/542,607, filed on Dec. 6, 2021, now Pat. No. 11,798,361, which is a continuation of application No. 16/881,159, filed on May 22, 2020, now Pat. No. 11,195,373, which is a continuation of application No. 16/059,656, filed on Aug. 9, 2018, now Pat. No. 10,665,055, which is a continuation of application No. 14/302,831, filed on Jun. 12, 2014, now Pat. No. 10,269,212, which is a continuation of application No. 13/429,848, filed on Mar. 26, 2012, now Pat. No. 8,756,315, which is a continuation of application No. 12/367,566, filed on Feb. 9, 2009, now Pat. No. 8,150,956.

(51) Int. Cl.
*G07F 17/32* (2006.01)
*H04M 1/72427* (2021.01)

(52) U.S. Cl.
CPC .......... *G07F 17/3244* (2013.01); *G07F 17/32* (2013.01); *G07F 17/3227* (2013.01); *G07F 17/323* (2013.01); *G07F 17/3288* (2013.01); *H04M 1/72427* (2021.01)

(58) Field of Classification Search
CPC .. G07F 17/3244; G07F 17/32; G07F 17/3227; G07F 17/323; G07F 17/3288; H04M 1/72427
See application file for complete search history.

(56) References Cited

U.S. PATENT DOCUMENTS

| | | | | |
|---|---|---|---|---|
| 7,637,810 B2* | 12/2009 | Amaitis | ............... | G07F 17/3223 463/40 |
| 7,942,738 B2* | 5/2011 | Alderucci | ............... | G07F 17/32 713/168 |
| 7,942,741 B2* | 5/2011 | Alderucci | ........... | G07F 17/3223 713/168 |
| 9,536,390 B2* | 1/2017 | Ehrlich | ............... | G07F 17/3227 |
| 2004/0162759 A1* | 8/2004 | Willis | ..................... | A63F 13/12 705/14.66 |
| 2004/0259626 A1* | 12/2004 | Akram | ..................... | G07F 17/32 463/17 |

(Continued)

*Primary Examiner* — Alina A Boutah

(57) ABSTRACT

An electronic device for mobile alerts is disclosed, along with a method for the same. The electronic device includes a network interface, a processor, and a data storage device. The processor implements the method, including receiving a stream of data for sporting events, receiving a gaming preference from a device, identifying matches with the gaming preference, and for each identified match, generating an alert for the mobile device including some summarization of information on the corresponding game.

5 Claims, 6 Drawing Sheets

(56) References Cited

U.S. PATENT DOCUMENTS

| | | | |
|---|---|---|---|
| 2006/0200746 A1* | 9/2006 | Kim | H04H 60/31 |
| | | | 715/234 |
| 2007/0060355 A1* | 3/2007 | Amaitis | G06Q 20/3224 |
| | | | 463/40 |
| 2007/0287478 A1* | 12/2007 | Park | H04W 4/48 |
| | | | 345/530 |
| 2007/0288954 A1* | 12/2007 | Chung | H04N 21/4314 |
| | | | 725/37 |
| 2008/0009343 A1* | 1/2008 | Sakuma | G07F 17/32 |
| | | | 463/25 |
| 2008/0254826 A1* | 10/2008 | Kwon | H04N 21/23614 |
| | | | 348/E7.001 |
| 2009/0093300 A1* | 4/2009 | Lutnick | G07F 17/3293 |
| | | | 463/31 |
| 2009/0209233 A1* | 8/2009 | Morrison | G08G 1/20 |
| | | | 455/411 |
| 2010/0113143 A1* | 5/2010 | Gagner | G07F 17/3241 |
| | | | 463/43 |
| 2010/0160022 A1* | 6/2010 | Oram | G07F 17/3248 |
| | | | 463/43 |
| 2010/0234100 A1* | 9/2010 | Gagner | G07F 17/32 |
| | | | 463/29 |
| 2010/0240455 A1* | 9/2010 | Gagner | G07F 17/3227 |
| | | | 463/30 |

* cited by examiner $$C = \begin{bmatrix} 2011 & 0212 & 1132 & 1222 \end{bmatrix}$$

FIG. 6

MOBILE GAMING ALERT

CROSS REFERENCE TO RELATED APPLICATION

This application is a continuation of U.S. patent application Ser. No. 17/542,607 filed Dec. 6, 2021, which is a continuation of U.S. patent application Ser. No. 16/881,159 filed May 22, 2020 (now U.S. Pat. No. 11,195,373 issued Dec. 7, 2021), which is a continuation of U.S. patent application Ser. No. 16/059,656 filed Aug. 9, 2018 (now U.S. Pat. No. 10,665,055 issued May 26, 2020), which is a continuation of U.S. patent application Ser. No. 14/302,831 filed Jun. 12, 2014 (now U.S. Pat. No. 10,269,212 issued Apr. 23, 2019), which is a continuation of U.S. patent application Ser. No. 13/429,848 filed Mar. 26, 2012 (now U.S. Pat. No. 8,756,315 issued Jun. 17, 2014), which is yet a further continuation of U.S. patent application Ser. No. 12/367,566 filed Feb. 9, 2009 (now U.S. Pat. No. 8,150,956 issued Apr. 3, 2012), each of which is hereby incorporated by reference in its entirety.

TECHNICAL FIELD

This patent application relates generally to gaming.

SUMMARY

This patent application describes methods and apparatus, including computer program products, for the creation and communication of gaming alerts.

DESCRIPTION OF THE DRAWINGS

FIG. 6 is a chart showing a matrix of alert registration coincidences.

Like reference numerals in different figures indicate like elements.

DETAILED DESCRIPTION

Figure 1:
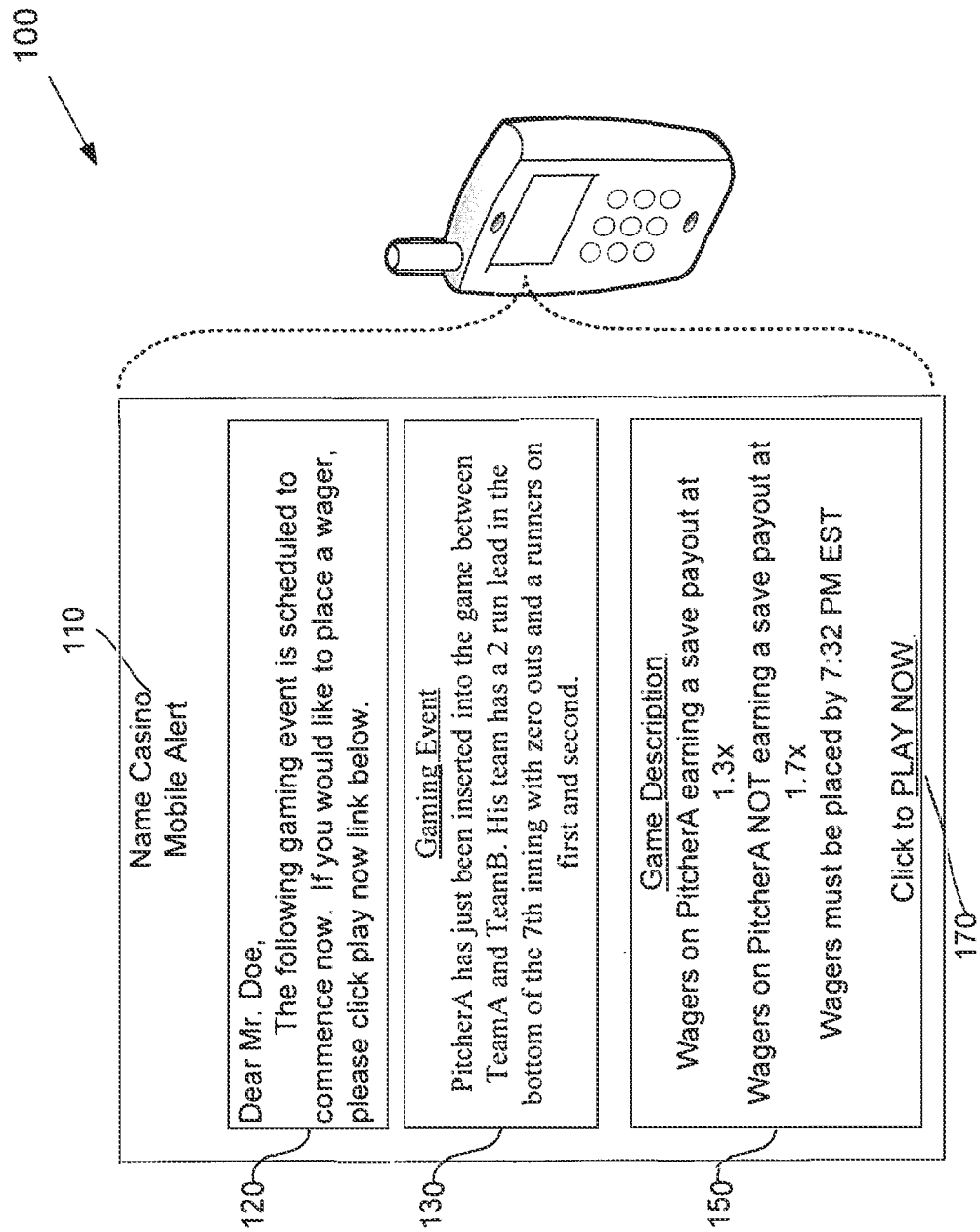
FIG. 1 depicts a mobile alert message viewed on a display.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, ... 9) and non-whole numbers (e.g., 1.1, 1.2, ... 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Games

In this application the term game refers to an event with a plurality of possible outcomes and a payout associated with each outcome. Games may also include a wager. Games may be played by a user called a player. A player plays a game by selecting one or more outcomes from the set of outcomes for the event. In some cases the player may also specify a wager for one or more of the selected outcomes. In other cases there may be a default wager. A wager of zero may be valid for some games. If a selected outcome occurs, the player wins which causes winnings to accrue to the player.

Winnings may be just a payout or a function of both a wager and the payout associated with a realized outcome. In cases where winnings are a function of both a wager and a payout, the payout may be a unitless scale factor. In general winnings may be monetary or non-monetary. For example, winnings may be money, points, or other prizes. Money may take the form of cash, credit, tokens that may be redeemed for cash, or reductions in debt.

One example of a game is wagering on whether a baseball pitcher will earn a save. In this example there 2 outcomes: yes or no. Example payouts might be yes->$1.3*W_y$, no→$1.7*W_n$, where $W_y$ and $W_n$ are wagers on the respective outcomes. For example, a player may select the yes outcome before the event takes place, in this case, before the pitcher plays the remainder of the baseball game. The player specifies a wager for the outcome, such as Wy=$10. If the pitcher earns a save, the player accrues winnings of $13. If the pitcher does not earn a save, the player accrues no winnings. Equivalently, this scenario can be described as a wager of Wy=$10 and Wn=$0. In some cases nonzero wagers on multiple outcomes may be allowed.

Another example of a game has an event which is a tennis match between two particular tennis players, Player A and Player B. This event may have six possible outcomes: Player A wins in 3 sets, Player A wins in 4 sets, Player A wins in 5 sets, Player B wins in 3 sets, Player B wins in 4 sets, Player B wins in 5 sets. Each of these possible outcomes may have a different payouts associated with them. In this example, all six outcomes have a payout of 4 times the wager associated with the outcome. A first player of the game specifies a wager of 5 units on the outcome that Player B wins in 4 sets. A second player of the game specifies a wager of 2 units on each of the outcomes that have Player A winning the tennis match. If Player A in fact wins the tennis match in 5 sets, then the first player accrues winnings of zero. The second player accrues winnings of 8 units.

In another example game, the event is a political election with three candidates running in the election. The set of possible outcomes is defined to be: Candidate A wins the election, Candidate B wins the election, or Candidate C wins the election. The associated payouts might be Candidate A wins->2*WA, Candidate B wins->2*WB, Candidate C wins->3*WC.

In another example game, the event is a storm making landfall at a particular location. The possible outcomes are defined to be: the category of the storm is 3 or less when landfall occurs, the category of the storm is 4, or the category of the storm is 5. The payouts may be 100 weather prediction score points for a correct prediction, with the selection of only one outcome allowed. A first player of the game selects the category 4 outcome. A second player selects the category 3 or less outcome. The storm in fact makes landfall as a category 2 storm. In this case, the first player accrues no winnings while the second player accrues 100 weather prediction score points.

Just about any event can be used as the predicate event for a game. For a given event, the set of possible outcomes may be partitioned in innumerable ways to define different games. The possibility that an event does not take place as scheduled or expected can be treated as a possible outcome and assigned a payout, such as 1 times a wager. Further, events can be defined as composites of other events. What is important is that a player has an opportunity to select outcomes and/or wagers before the player is aware of the true outcome of the underlying event.

XII. Alerts

In this application the term alert refers to a message sent to a mobile device that identifies one or more games with events that are scheduled to occur. A mobile device is an electronic device that is capable of sending and receiving wireless communication signals and may be operated on battery power. Alerts may be sent at configurable times in relation to, for example, the identification of the scheduled event or the time at which the event is scheduled to occur. The alert message may include a description of the event and a description of the game. The description of the game may include a listing of the possible outcomes defined for the event and the payouts associated with each outcome. The description of the game may also describe limits on allowed wagers. An alert may prompt a user for a response. An alert may be formatted and personalized to the recipient or the sender.

FIG. 1 shows a display of information from an example alert for the case of the pitcher save game described in section XI. The display 100 includes a header portion 110 which has been customized for the sender of the alert, which in this case is a casino. The display also includes a greeting portion 120 personalized to the recipient of the alert. The display includes an event information portion 130 that displays text describing the event that is scheduled to occur. The event information includes a time when the event is scheduled to occur. The event information portion may also include graphics or video related the event. The display includes a game description portion 150 that identifies one or more games associated with the event. In the depicted example, one game is identified. The game description portion includes a listing of the two possible outcomes defined for this game and their associated payouts. The display also includes a response prompt portion 170 that requests a response from the player receiving the alert.

The display of the alert may include multiple pages or views that allow more detail on particular aspects of the alert to be viewed by the player receiving the alert upon request. For example, clicking on an icon or link may access alternate views that display more detail on a particular aspect of the alert information.

An alert may include an audio component. For example, the mobile device may play a ring tone when an alert is received. Alerts may include recorded voice messages.

In some embodiments alert massages may cause a mobile device to vibrate.

The presentation of an alert may vary as a function of the sensed location of the mobile device that receives the alert. For example, when the mobile device is located in area that is usually crowded or loud, such as the main floor of a casino, an audio component of the alert may be played at a high volume level or induce vibration of the mobile device.

A response prompt portion may provide a link to a gaming service provider website. A response prompt may optionally solicit wager information from a player receiving the alert. A range of allowed wagers may be specified, and wagers solicited in the display by using a sliding bar that allows the player to click or drag to select an allowed wager. Wagers may also be input through a text interface.

XIII Gaming Preference

In this application the term gaming preference refers to information indicative of one or more games that a user has interest in. The gaming preference may also specify certain parameters of a game, such as a default wager or how far in advance of the actual event, the alert messages should be sent to the user. A gaming preference may identify a set of games directly, for example through the use of assigned game identifiers. Alternatively a gaming preference may specify games indirectly by describing the events associated with games of interest or other aspects of games that are of interest.

The direct identification of games by a user may be facilitated by providing a listing of available games and an interface for browsing and/or searching the listing. A listing of games may be organized in logical categories and the selection of all games in one or more categories may be one allowed method of specifying a gaming preference. Searching of a listing of available games may be done with text searching of game names, of event descriptions, or other meta data associated with the games.

One way to specify games of interest indirectly is to allow the user to enter a text query related to events of interest. This text query may be transmitted as part of a gaming preference to a gaming service provider. The provider may store the gaming preference and use the text query to search game or event descriptions at times in the future. The text queries may be conducted using any text searching techniques, such as natural language queries or more structured operator based queries.

A gaming preference may also include other optional parameters specifying how alerts should be handled or other aspects of the gaming experience. For example, a gaming preference may specify the timing of alert transmissions. The timing can be specified in relation to when the event underlying a game of interest is first detected or in relation to when the event is scheduled to occur. Another parameter that may be specified in a gaming preference is a default wager for a game of interest.

An example gaming preference in the indirect style is "golf tournament tiger woods", {24 hours prior}

In this case, the gaming preference includes a text string that can be matched to gaming event descriptions using text searching techniques. This gaming preference might match games that have been set up relating to Tiger Woods participation in a golf tournament, such as will Tiger Woods win the Masters Tournament (yes, no); what place will Tiger finish the a tournament in (1st place, 2nd place, . . . disqualified); or what will tiger shoot at the U.S. Open (5 under, 4 under, more than 4 under, etc.). Alerts would be sent 24 hours before the gaming event, most likely a golf tournament in this case, is scheduled to commence.

XIV. Player Interface

A player or end user may access gaming services through a mobile device. A mobile device is an electronic device that is capable of sending and receiving wireless communication signals and may be operated on battery power. Mobile devices may include one or more user output components such as a display or speaker. Mobile devices may include one or more user input components such as a keypad, touchpad, or touch-screen. Some example mobile devices are a cell phone, a personal digital assistant (PDA), or a dedicated mobile gaming device with a hardware interface customized for gaming applications.

A mobile device may also be configured to determine its geographic location with respect to reference points. In some jurisdictions gambling activities are legally restricted to designated areas. For example, a casino may be licensed offering gambling services only to customers physically located within its place of business. A casino may also choose to limit mobile gaming activities to certain designated areas within a building. Therefore it is desirable to enable a mobile device that is used by a player to access gaming services to detect whether or not the device is currently located within a designated area.

In some embodiments, a mobile device may include a location detector. The location detector may be a GPS (Global Positioning System) based detector. In alternative embodiments, a location detector may comprise a Bluetooth device. For example, a location detector may be a Bluetooth transceiver that either reads Bluetooth information from other Bluetooth devices such as devices having beacons. The Bluetooth information may differ depending on which Bluetooth device is supplying information, such that the Bluetooth device may be identified. Alternatively, a location detector may be a wireless network receiver or transceiver that can at least read information, including beacon information, from one or more wireless networking devices such as wireless networking access points. A location detector may analyze signal strength values received from various wireless signal sources such as beacons (e.g. Bluetooth beacons) or signal strength values received via wireless networking component or external system interface to determine a current location. A location detector may receive multiple signal strength indications representing signal strengths from multiple wireless signal sources such as beacons for Bluetooth devices or access points and use the signal strength values to determine a location for the mobile device. Additionally, a location detector may be able to determine a position based on the timing of the arrival of signals such as beacon signals from various types of wireless devices. In still further embodiments, a location detector may be an inertial guidance based system.

In some embodiments, the mobile device may be configured as a thin client for gaming applications that does little more than convey input and output signals to and from a gaming server. For example software controlling the graphical user interface for gaming applications may be run on a remote gaming server.

XV. Gaming Server

A gaming server communicates with a mobile device to a provide player using the mobile device with access to gaming services. A gaming server supports one or more games that players can play by accessing either the gaming server or a related server. A gaming server allows registration of players or mobile devices to receive alerts related to one or more supported games. A gaming server allows a player to submit gaming preference data that is stored for later use in generating alerts. A player may enter gaming preference data through a mobile device which is then relayed to the gaming server. When an event associated with a game is scheduled to occur, the gaming server sends alerts to all mobile devices that have been identified in submitted gaming preference data as a destination for alerts related to the game. A mobile device identified as a destination for alerts by information stored by the gaming server is said to be registered to receive alerts. Similarly, gaming preferences are said to be registered when they are received by a gaming server and used to update alert registration information.

A gaming server includes or has access to a data storage device that stores information related to supported games and registered players or mobile devices. For example, the data storage device may be hard drive that is accessed via a bus, or the data storage device may be a database server that is accessed via a communications network, such as an Internet Protocol network. The information related to supported games may include, for example, descriptions of the event underlying a game, payouts, or other rules and meta data. The information related to players may include, for example, gaming preferences, a unique identifier for a mobile device associated with the player, or information sufficient to contact the mobile device such as a network address.

In one embodiment, the information regarding player gaming preferences that is stored on the data storage device is organized by supported games. The information for each supported game includes a list of player or mobile device identification information for mobile devices registered to receive alerts related to the game.

In another embodiment, the information regarding player gaming preferences that is stored on the data storage device is organized by player or mobile device. The information for each registered mobile device includes one or more gaming preferences. These gaming preferences may be stored as one or more gaming preference records. These gaming preferences may also be stored as unified list of supported games that mobile device is registered to receive alerts for.

XVI. Gaming Event Detection

To provide timely alerts to registered mobile devices, a gaming server determines when an instance of a supported game event is scheduled to occur. A gaming event detector is used to process incoming datastreams and extract information regarding scheduled game events. A gaming event detector may be an integrated component of a gaming server. Alternatively, a gaming event detector may be a separate device that passes information regarding detected game events to one or more gaming servers.

In this application a current event refers to an event with an outcome that is expected to be revealed in the future. Some example current events include a scheduled tennis match, playoff at the end of golf tournament ending in a tie, a baseball pitcher being inserted into a game with a save opportunity, a weather forecast, or an election. News datastream refers to information sent over a communications network by a news provider that includes descriptions of current events. A news datastream may comprise, for example, a sequence of data bearing packets or a circuit switched connection between a gaming event detector and a remote device operated by a news provider.

Figure 2:
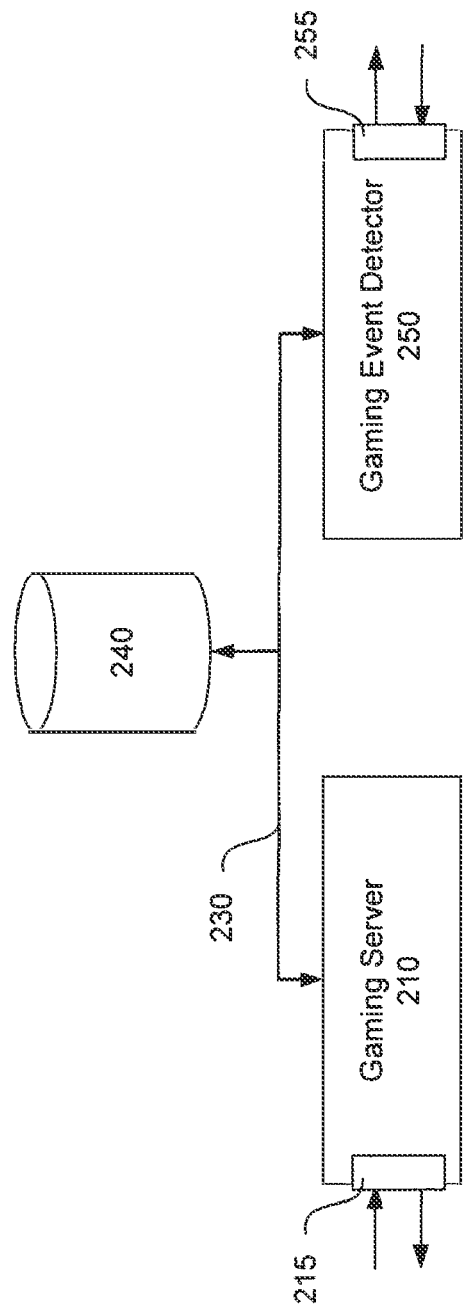
FIG. 2 is a block diagram of a system including a gaming server and a gaming event detector.
Figure 3:
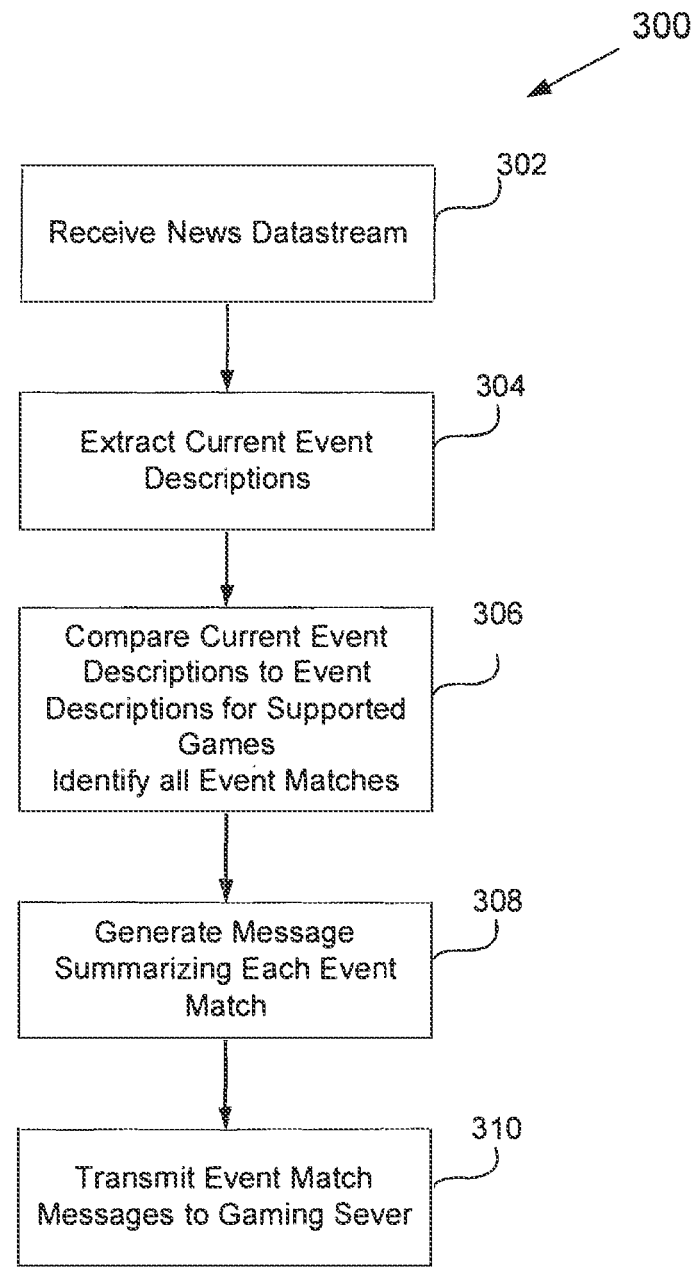
FIG. 3 is a flowchart of an event match identification process.
Figure 4:
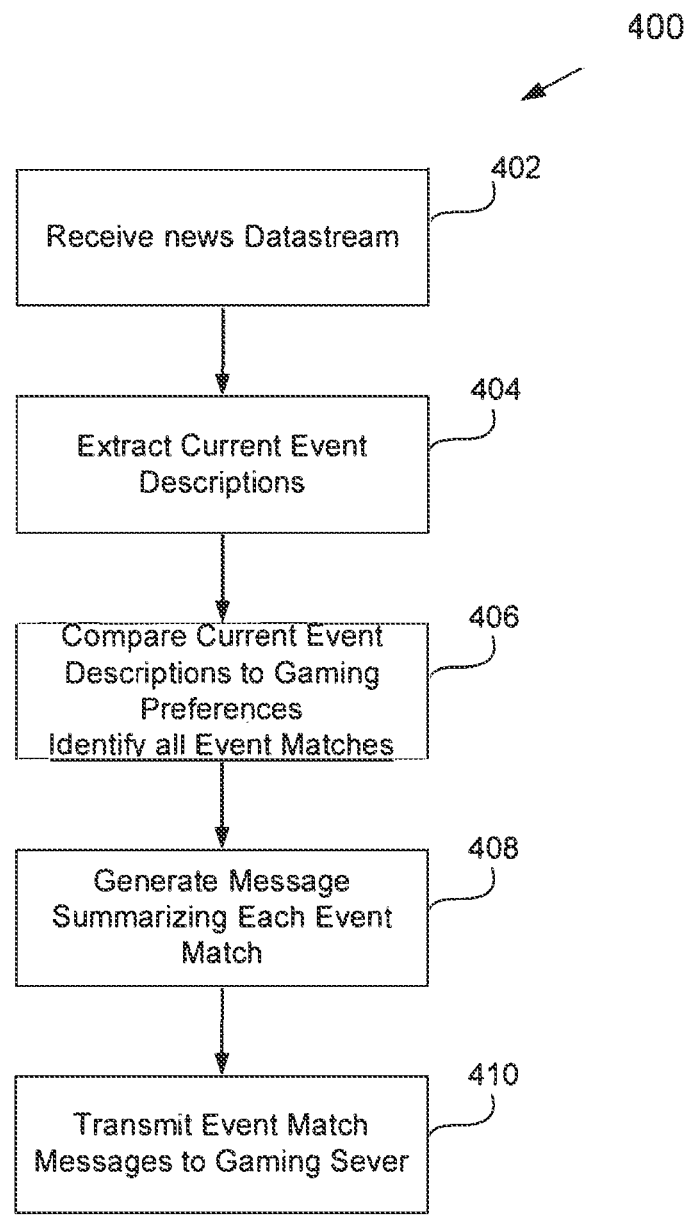
FIG. 4 is a flowchart of an event match identification process.

FIG. 2 depicts an exemplary mobile alert system 200. The mobile alert system 200 includes a gaming server 210 which is configured to accept gaming preference registrations from and send alerts to mobile devices via a network interface 215. The network interface 215 may be wireless interface that allows direct communication with mobile devices. Alternatively, the network interface may allow transmissions to and from a network including one or more wireless access points that in turn communicate directly with mobile devices. The gaming server is also connected to a local area network (LAN) 230 that allows it to communicate with other components in the mobile alert system 200. The system also includes data storage device 240 for storing information regarding supported, registered gaming preferences, or other alert related data. The data stored on the data storage device 240 may be accessed by the gaming server 210 via the LAN 230. The system also includes a gaming event detector 250, which is able to access the data storage device 240 and communicate with the gaming server 210 via the LAN 230. The gaming event detector receives one or more data streams from providers of news via a network interface 255. In normal operation, the gaming server 210 updates alert registration information stored in the data storage device 240. The gaming event detector 250 processes incoming datastreams bearing news to extract information about events related to game events or registered gaming preferences. The detector accesses information regarding supported games or gaming preferences stored in the data storage device 240 in order to complete this processing. When game events are detected, the detector 250 sends formatted messages summarizing the detected events to the gaming server 210. The gaming server 210 in turn sends alerts corresponding to the detected events to all mobile devices registered to receive those alerts.

In other embodiments, a gaming server may be more closely integrated with the gaming event detector. For example, the gaming server and the event detector may be software run on the same processing device.

In other embodiments, a gaming server may be more remote from the gaming event detector. For example, the gaming server and the event detector may be located at distant locations and communicate over a wide area network (WAN). The gaming server and the event detector may be operated by different entities. A remote gaming event detector may store a copy of data related to supported games or gaming preferences in its own local data storage device. In this case the stored data may be updated in response to synchronization or update messages sent by a remote gaming server.

A gaming event detector outputs messages summarizing current events related to supported games or registered gaming preferences. These messages are sent to a gaming server. The messages are formatted so that the gaming server may decode the new data and easily determine what supported games or which gaming preferences are implicated by the new data. The gaming server may then generate resulting alerts that will be forwarded to registered mobile devices. For example, the messages may be formatted as extensible markup language (XML) messages. XML is used to create a tagging scheme that allows elements of a document to be marked according to their content rather than their format.

Alerts may be sent to a mobile device as soon as a current event implicating the alert is detected. Alternatively, alerts may be queued and sent at later times configured in accordance with parameters of the associated gaming preference. For example, a gaming preference may implicate Game A and include a parameter that requests alerts to be sent one hour prior to the scheduled time for the event associated with Game A. If news regarding the scheduling of an instance of the event is detected two days prior to scheduled time, then this information may be stored in timed release buffer. When the designated time arrives, the alert may be generated and/or sent to the mobile device and the corresponding entry cleared from the buffer. The timed release buffer may be implemented as a linked list of transmission time slots, where each slot includes a linked list of scheduled alerts to be generated and/or sent.

When alerts are generated, they incorporate information from the gaming event detector regarding the gaming event detected. The alerts may also be customized for the gaming server it is being sent from or the mobile device it is to be sent to. In this manner a gaming event detector may be shared by multiple gaming servers.

XVII. Sharing Gaming Preferences and Alerts

Players may wish to share gaming preferences or alerts with other players. Some embodiments facilitate the sharing of gaming preferences or alerts by players or across multiple mobile devices.

In one embodiment, gaming preferences may be registered for multiple mobile devices by including information identifying multiple mobile devices in a single gaming preference registration communication. Authentication information may be required for each mobile device registered in this manner.

In another embodiment, a gaming server may facilitate sharing of gaming preferences by providing a forwarding service that allows players to propose gaming preferences to other players in messages that are forwarded to a player's mobile device by the gaming server. These messages may drive an interface on a mobile device to make registering a proposed gaming preference easy for the player receiving the message. For example, registering a proposed gaming preference may require only clicking an icon or link in the message.

In another embodiment, a gaming server may facilitate sharing of alerts by providing a forwarding service that allows players to forward received alerts to other players in messages that are forwarded to a player's mobile device by the gaming server.

In another embodiment, a gaming service may make a player directory available to registered players. The player directory may include contact information such as a network address for a mobile device associated with a player. The accessibility of a player's contact information in the directory to other players may be controlled or configured by that player. Players may use contact information from the player directory to directly send alerts or gaming preference proposal messages to the mobile devices of other players.

XVIII. Predicting Gaming Preferences

To promote mobile gaming activity it is helpful to inform players about what games are supported by a gaming server. Since the number of supported games may be large, it is desirable to focus limited marketing materials on supported games that a particular player is most likely to have interest in. The games a player is most likely to have interest in may be predicted based in part on the player's existing alert registration information as well as patterns in the alert registrations of all players registered to receive alerts. Once the games most likely to be of interest to a particular player are identified, a gaming server may market those games to the player through messages sent to a mobile device that suggest the registration of a gaming preference implicating the identified game or games. The identified games may also be promoted through other targeted advertising directed to the player.

Given a set of supported games and a set of players or mobile devices registered to receive alerts for one or more of those games, it is possible to identify patterns of coincident interest in certain games. Coincidence of registration is when a single mobile device is registered to receive alerts for all games in a subset of the supported games. Coincidence of registration for subsets of the supported games may be used to predict which games a player using a particular mobile device is most likely to be interested in. The basic idea is that if many of the players registered to receive alerts for one game are also registered to receive alerts for a second game, then it is likely that a player registered for the first game, but not the second game, would be interested in learning about the second game. This concept can be extended to larger subsets in cases where having mobile devices that have larger groups of games in common gives more information than many pairwise matches spread over a larger group of mobile devices.

Figure 5:
FIG. 5 is a chart of alert registrations.

FIG. 5 is a chart of alert registrations for an example scenario of a gaming server supporting four games (A-D) with five mobile devices (1-5) registered to receive alerts for one or more of the games. In the chart, if a mobile device is registered to receive alerts for a supported game, the corresponding entry is a one. Otherwise the corresponding entry is a zero. This alert registration scenario will be used to illustrate gaming preference prediction method described below.

One method for identifying and tracking alert registration patterns is to maintain a coincidence matrix for the supported games. A coincidence matrix is a symmetric square matrix that has rows and columns for each game supported by the gaming server. Each entry of the coincidence matrix is the number of mobile devices registered to receive alerts for both the game corresponding to the row and the game corresponding to the column. FIG. 6 shows a coincidence matrix representing coincidence of registration for all pairs of supported games for the registration scenario depicted in FIG. 5. The first row and first column correspond to game A. The second row and second column correspond to game B, and so on.

The games a player is most likely to be interested in can be predicted using the coincidence matrix and the player's existing gaming preferences. The gaming preferences associated with a mobile device may be represented as a binary registration vector corresponding to one of the rows in the chart of FIG. 5. This registration vector may be multiplied by the coincidence matrix to calculate an interest vector that represents the relative likelihoods that the player will be interested in each of the supported games. Next, entries in the interest vector corresponding to games the player already is registered to receive alerts for are removed or zeroed. Finally, the remaining entries may be sorted to identify which of the remaining supported games are most likely to be of interest to the player. The remaining entry with the maximum value is most likely to be of interest and so on for as many games as desired.

For example, in the scenario of FIG. 5, mobile device 4 has a registration vector of [0 1 0 1] T. Multiplying this registration vector by the coincidence matrix of FIG. 6 results in an interest vector of [1 4 3 5]T. Zeroing the second and fourth entries, because mobile device 4 is already registered to receive alerts for games B and D, results in an interest vector of [1 0 3 0]T. The maximum remaining entry is the three associated with game C. Therefore the method predicts that the player using mobile device 4 is most likely to be interested in game C.

For scenarios with more supported games, sparse matrix techniques may be used to simplify the calculations including the matrix multiplication. The coincidence matrix may be generated each time a marketing application is run. Alternatively, the coincidence matrix may be stored and updated each time a new gaming preference is registered or deleted in the gaming server. In the example of FIG. 6, only half of the entries need to be stored because of the symmetry properties. This storage requirement may be further reduced using sparse matrix techniques.

The coincidence of registrations are calculated for each defined subset by testing the registered gaming preferences of each mobile device and counting the number of mobile devices that are registered for all games in the subset. The coincidences of registration for each subset may be stored for later use in predicting which supported games the player using a particular mobile device would most likely be interested in. These stored coincidence of registration values may be updated each time a gaming preference is registered or deleted. For example, this process may be used to generate the coincidence matrix elements of FIG. 6, which is a case where all of the defined subsets are pairs of supported games. This process may also be applied to calculate coincidence of registration values for defined subsets with more than two members.

A prediction of which games will be of interest to a player may be determined by adding coincidence of registration values for defined subsets for which the player is not registered for exactly one of the games in the subset. An interest indicator value may be calculated for each supported game that satisfies two criteria: (i) the player is not currently registered to receive alerts for the game; and (ii) the game is the only game in at least one defined subset that the player is not currently registered to receive alerts for. An interest indicator value is calculated by adding the coincidence of registration values for all subsets satisfying criterion (ii). The coincidence of registration values added to calculate an interest indicator value may optionally be weighted differently. For example, subsets of larger sizes may be weighted more heavily. Games with the largest interest indicator values are then selected as the games the player is most likely to be interested in.

Another method for identifying alert registration patterns predicting games of interest is to start by analyzing the alert registrations of a particular player and considering only defined subsets of the supported games for which the player is registered to receive alerts for all but one missing member of the subset. Coincidence of registration value may then be calculated on as needed basis to reduce complexity in certain circumstances.

Messages sent to a mobile device to suggest games of interest may include descriptions of the games, including descriptions the event and/or a schedule for upcoming instances of the event. Messages suggesting games of interest may also prompt a player to submit a preformatted gaming preference that has been generated to implicate one or more games of interest. For example, the player may be prompted to register the gaming preference by clicking a link.

Further Embodiments

The following should be interpreted as further embodiments and not as claims.
A—A method comprising:
  receiving a datastream describing news;
  extracting one or more descriptions of current events from the datastream;
  identifying event matches based on the one or more descriptions of current events and event descriptions associated with games; and
  transmitting data describing event matches to a remote device.
A.1—The method of claim A, wherein the data describing event matches includes information identifying a game and information regarding the current event, including the time when the current event is scheduled to occur.
A.2—The method of claim A, further comprising formatting the data in an XML format.
A.3—The method of claim A, further comprising identifying mobile devices that are registered to receive alerts regarding event matches.
A.4—The method of claim A.3, wherein the transmitted data also includes lists of mobile devices that are registered to receive alerts regarding event matches.
B—A system comprising:
  a data storage device storing information regarding a plurality of games, wherein a game includes a wager, an event with a plurality of possible outcomes, and a payout associated with each outcome, and wherein the stored information includes, for each game, a list of mobile devices registered to receive alerts associated with the game; and
  a processing device configured to:
  receive data comprising information related to the games;
  identify matches between information in the data and one or more games by searching game information stored in the data storage device; and
  for each match, generate at least one alert message for each mobile device registered to receive alerts associated with the game, wherein the alert message includes a summary of information from the data regarding the game including when a game event is scheduled to occur.
B.1—The system of claim B, further comprising a server configured to transmit an alert generated by the processing device to a mobile device identified as the target of the alert.
B.2—The system of claim B.1, wherein the server transmits alerts to the mobile device upon receipt from the processing device.
B.3—The system of claim B.1, wherein the server stores an alert and transmits it to the mobile device at one or more configured times prior to the scheduled gaming event.
B.4—The system of claim B.3, wherein the alert transmission times are determined at least in part by gaming preference data.
B.5 The system of claim B.1, wherein the server is further configured to:
  receive a request from the mobile device that an alert be forwarded to a second mobile device; and
  transmit the alert to the second mobile device.
C—A method comprising:
  specifying a gaming preference with gaming preference data indicative of one or more games; and
  transmitting the gaming preference data to a server.
C.1—The method of claim C, wherein the gaming preference data includes a default wager.
C.2—The method of claim C, further comprising transmitting information identifying a mobile device to receive alerts regarding the gaming preference.
C.3—The method of claim C.2, further comprising transmitting information specifying the timing of future alert messages.
C.4—The method of claim C.2, further comprising transmitting information identifying an additional mobile device to receive alerts regarding the gaming preference.
C.5—The method of claim C.2, further comprising transmitting a request to the gaming server for gaming preference data to be forwarded to a different mobile device.
C.6 The method of claim C, further comprising receiving confirmation that the server received the gaming preference data.
C.7 The method of claim C.6, further comprising receiving confirmation that the gaming preference data is valid and has been registered by the server.
C.8 The method of claim C.7, further comprising receiving a list of games matching the gaming preference data.
D—A method comprising:
  receiving an alert message via a wireless communication transmission from a server, wherein the alert message includes information describing a game and a scheduled game event, wherein a game includes an event with a plurality of possible outcomes, a wager, and a payout associated with each outcome.

D.1—The method of claim D, further comprising transmitting wager information for a game identified in the alert to a server.

D.2—The method of claim D, wherein the alert message is received using a mobile gaming device that checks whether the mobile gaming device is currently located within a designated area for gaming.

D.3—The method of claim D, further comprising forwarding the alert to a second mobile device.

D.4—The method of claim D.3, wherein the forwarding comprises sending a request to the server that the alert be sent to the second mobile device.

E—An apparatus comprising:
  a wireless communication transmitter and receiver configured to transmit signals to a server and receive signals from the server, wherein the server is programmed to access information associated with a plurality of games, each game including a wager, an event with a plurality of possible outcomes, and a payout associated with each outcome, and wherein the transmitter and receiver are further configured to:
  transmit gaming preference data to the server, the gaming preference data including data indicative of one or more games; and
  receive confirmation regarding the validity of the gaming preference and registration of the gaming preference from the gaming server;
  a display for displaying information about games and gaming preferences; and
  a data entry device for inputting gaming preference data.

E.1—The apparatus of claim E, further comprising a device that detects geographic location of the mobile device.

E.2—The apparatus of claim E.1, wherein the device that detects geographic location of the mobile device includes global positioning service receiver.

F—A method comprising:
  receiving a datastream describing news;
  extracting one or more current event descriptions from the datastream;
  identifying event matches based on the one or more current event descriptions and gaming preferences; and
  transmitting data describing event matches to a remote device.

F.1—The method of claim F, further comprising, for each event match, generating an event match record including information identifying a gaming preference and information regarding the current event, including the time when the event is scheduled to occur.

F.2—The method of claim F, wherein the transmitting data comprises formatting the data in an XML format.

F.3—The method of claim F, further comprising identifying mobile devices that are registered to receive alerts regarding the event matches.

G—A system comprising:
  a data storage device storing gaming preferences that include data indicative of one or more games and data identifying at least one mobile device registered to receive alerts regarding the games, wherein a game includes a wager, an event with a plurality of possible outcomes, and a payout associated with each outcome; and
  a processing device configured to:
  receive data comprising information related to one or more games;
  identify matches between information in the data and one or more gaming preferences by searching gaming preferences stored in the data storage device; and
  for each match, generate an alert message summarizing information from the data regarding games described by the gaming preference.

H—A computer readable medium encoded with computer executable instructions which, when executed, direct a computer to perform the method of claim A.

I—A computer readable medium encoded with computer executable instructions which, when executed, direct a computer to perform the method of claim G.

J—A method comprising:
  reading alert registration data from a data storage device that stores records describing a plurality of games, wherein each record includes a list of mobile devices registered to receive alerts regarding the game;
  determining the number of mobile devices registered to receive alerts for all of the games in a subset of the plurality of games consisting of two or more games;
  determining an estimate of the correlation among user interests in the subset of games based at least in part on the count; and
  storing the estimate.

J.1—The method of claim J, wherein the subset of games is a pair of games.

J.2—The method of claim J wherein the subset of games includes three games.

J.3—The method of claim J, further comprising:
  counting the number of mobile devices registered to receive alerts for each pair of the plurality of games;
  calculating estimates of the correlations between user interest in the pairs of games based at least in part on the counts; and
  storing the estimates of the correlations.

J.4 The method of claim J.3, further comprising:
  reading a list of games that a mobile device is registered to receive alerts for; and
  summing the estimates of the correlations for pairs that include the games the mobile device is currently registered to receive alerts for to and a game that the users is not currently registered to receive alerts for; and
  identifying one or more games of interest that the mobile device is not currently registered to receive alerts for, based at least in part on the sum associated with that game or games.

J.5 The method of claim J.4, further comprising transmitting a list of games of interest for the mobile device.

J.6 The method of claim J.4, further comprising:
  identifying a gaming preference that, if adopted by a user for a mobile device, would register the mobile device to receive alerts for the games of interest;
  transmitting a message proposing the gaming preference.

K—A method comprising:
  reading one or more gaming preferences registered for a mobile device; and
  identifying a set of games which are not implicated by any of the gaming preferences registered for the mobile device but that have high rates of coincidence of alert registration relative to other sets of games described in a register of gaming preference registrations for a plurality of mobile devices.

K.1—The method of claim K, further comprising transmitting a list of games of interest for the mobile device.

K.2 The method of claim K, further comprising:
identifying a gaming preference that, if adopted by a user for a mobile device, would register the mobile device to receive alerts for the games of interest;
transmitting a message proposing the gaming preference.

Elements of different embodiments described herein may be combined to form other embodiments not specifically set forth above. Other embodiments not specifically described herein are also within the scope of the following claims.

The invention claimed is:

1. A non-transitory computer-readable medium with instructions stored therein which, when executed, cause at least one processor to:
   receive a datastream;
   extract one or more descriptions of current events from the datastream;
   identify event matches based on the one or more descriptions of current events and event descriptions associated with a plurality of games;
   identify alert registration data associated with each game in the plurality of games, wherein the alert registration data includes a list of mobile devices registered to receive an alert message regarding each game in the plurality of games;
   determine a number of mobile devices registered to receive the alert message for each game in a subset of the plurality of games, wherein the subset comprises a game and at least one other game;
   determine an estimate of correlation among user interests in the subset of the plurality of games;
   store the estimates of the correlations; and
   transmit data describing the event matches to a first mobile device;
   receive a request from the respective mobile device that the alert message be forwarded to a second mobile device; and
   transmit the alert message to the second mobile device.

2. The non-transitory computer-readable medium of claim of claim 1, wherein in determining the estimate of the correlation among user interests in the subset of the plurality of games, the at least processor further configured to maintain a coincidence matrix for the plurality of games.

3. The non-transitory computer-readable medium of claim of claim 1, wherein the data describing event matches includes information identifying a game and information regarding the current event, including the time when the current event is scheduled to occur.

4. The non-transitory computer-readable medium of claim of claim 1, wherein the instructions stored therein, when executed, further cause the at least one processor to generate a summary of payouts associated with a potential outcome of the gaming event.

5. The non-transitory computer-readable medium of claim of claim 1, wherein the instructions stored therein, when executed, further cause the at least one processor to store the alert message in at least one data storage device and transmit the alert message to the respective mobile device at one or more configured times prior to the gaming event.

* * * * *